United States Patent
Qureshi

(10) Patent No.: US 10,552,021 B2
(45) Date of Patent: *Feb. 4, 2020

(54) MEDIA LIBRARY ANALYZER

(71) Applicant: Amazon Technologies, Inc., Seattle, WA (US)

(72) Inventor: Aneeb Naveed Qureshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 673 days.

This patent is subject to a terminal disclaimer.

(21) Appl. No.: 15/200,415

(22) Filed: Jul. 1, 2016

(65) Prior Publication Data

US 2016/0328136 A1 Nov. 10, 2016

Related U.S. Application Data

(63) Continuation of application No. 13/968,540, filed on Aug. 16, 2013, now Pat. No. 9,383,965.

(51) Int. Cl.
*G06F 3/0484* (2013.01)
*G06F 3/16* (2006.01)
*G06F 16/68* (2019.01)
*G11B 27/36* (2006.01)
(Continued)

(52) U.S. Cl.
CPC .......... *G06F 3/04847* (2013.01); *G06F 3/167* (2013.01); *G06F 16/68* (2019.01); *G11B 27/105* (2013.01); *G11B 27/329* (2013.01); *G11B 27/36* (2013.01)

(58) Field of Classification Search
CPC ......... G06F 17/30772; G06F 17/30766; G06F 17/30749; G06F 17/30752; G06F 17/30038; G06F 17/30761; G06F 17/30817; G06F 3/167; G06F 3/04847; G06F 16/68; G06Q 30/02; G06Q 30/0631; G06N 5/02;
(Continued)

(56) References Cited

U.S. PATENT DOCUMENTS 7,081,579 B2 7/2006 Alcalde et al.
7,358,434 B2 4/2008 Plastina et al.
(Continued)

OTHER PUBLICATIONS

Liu, Ning-Han et al. "Adaptive music recommendation based on user behavior in time slot." International Journal of Computer Science and Network Security 9.2 (2009): 219-227.
(Continued)

*Primary Examiner* — Andrew L Tank
(74) *Attorney, Agent, or Firm* — Thomas | Horstemeyer, LLP

(57) ABSTRACT

Disclosed are various embodiments analyzing a user's interaction with his or her music library. The system generates a time series by tracking a plurality of instances of music library interaction between a user and a music library. The system also determines a distribution expressed in the time series, the distribution indicating a trend of playing a set of audio items for a particular period of time, the set of audio items being associated with a class, wherein a timestamp corresponds to an occurrence of the trend. The system associates the distribution with a triggering event and generates a recommendation according to the class in response to the triggering event.

20 Claims, 7 Drawing Sheets

(51) Int. Cl.
*G11B 27/32* (2006.01)
*G11B 27/10* (2006.01)

(58) Field of Classification Search
CPC .. H04L 67/22; H04N 21/4532; G11B 27/329;
G11B 27/36; G11B 27/105
See application file for complete search history.

(56) References Cited

U.S. PATENT DOCUMENTS

| | | | |
|---|---|---|---|
| 7,383,243 B2* | 6/2008 | Conkwright | G06Q 30/02 |
| | | | 705/14.41 |
| 7,542,816 B2 | 6/2009 | Rosenberg | |
| 7,584,159 B1 | 9/2009 | Chakrabarti et al. | |
| 7,711,838 B1* | 5/2010 | Boulter | G06F 17/30761 |
| | | | 709/231 |
| 8,260,778 B2 | 9/2012 | Ghatak | |
| 8,316,015 B2 | 11/2012 | Svendsen et al. | |
| 8,568,277 B2 | 10/2013 | Johnson | |
| 8,583,674 B2 | 11/2013 | Zheleva et al. | |
| 8,611,285 B2* | 12/2013 | Henning | H04N 5/4401 |
| | | | 348/14.02 |
| 8,620,919 B2 | 12/2013 | Gates et al. | |
| 8,645,373 B2* | 2/2014 | Knight | G06F 17/30743 |
| | | | 707/733 |
| 8,868,564 B1 | 10/2014 | Ogilvie | |
| 8,875,021 B2* | 10/2014 | Lee | G11B 27/031 |
| | | | 715/716 |
| 2006/0143647 A1* | 6/2006 | Bill | G06F 17/30743 |
| | | | 725/10 |
| 2007/0088727 A1 | 4/2007 | Kindig | |
| 2007/0204227 A1* | 8/2007 | Kretz | G06F 3/0482 |
| | | | 715/727 |
| 2008/0021851 A1* | 1/2008 | Alcalde | G06F 17/30743 |
| | | | 706/21 |
| 2009/0013260 A1 | 1/2009 | Martin et al. | |
| 2009/0031882 A1* | 2/2009 | Kemp | G06F 17/30743 |
| | | | 84/609 |
| 2009/0037355 A1 | 2/2009 | Brave et al. | |
| 2009/0094095 A1* | 4/2009 | Slaney | G06Q 10/10 |
| | | | 705/7.29 |
| 2009/0182736 A1* | 7/2009 | Ghatak | G06Q 30/02 |
| 2010/0050078 A1 | 2/2010 | Refuah et al. | |
| 2010/0071005 A1* | 3/2010 | Kusunoki | G06F 17/30781 |
| | | | 725/46 |
| 2010/0162115 A1* | 6/2010 | Ringewald | G06F 17/30743 |
| | | | 715/716 |
| 2010/0332440 A1 | 12/2010 | Brodsky | |
| 2012/0233164 A1* | 9/2012 | Rowe | G06F 17/30743 |
| | | | 707/737 |
| 2012/0278330 A1* | 11/2012 | Campbell | G06F 17/30038 |
| | | | 707/740 |
| 2013/0159298 A1 | 6/2013 | Mason et al. | |
| 2013/0205223 A1 | 8/2013 | Gilbert | |
| 2013/0290348 A1* | 10/2013 | Jung | G06F 17/30766 |
| | | | 707/748 |
| 2014/0025620 A1 | 1/2014 | Greenzeiger et al. | |
| 2014/0101170 A1 | 4/2014 | Parekh et al. | |
| 2014/0114985 A1 | 4/2014 | Mok et al. | |
| 2015/0067509 A1 | 3/2015 | Alexandersson et al. | |

OTHER PUBLICATIONS

Chen, Ya-Xi, Dominikus Baur, and Andreas Butz. "Gaining musical insights: Visualizing multiple listening histories." Workshop on Visual Interfaces to the Social and Semantic Web (VISSW2010). 2010.

Dias, Ricardo, Manual J. Fonseca, and Daniel Gonsalves. "Interactive exploration of music listening histories." Proceedings of the International Working Conference on Advanced Visual Interfaces. ACM, 2012.

Goto, Mastaka and Takayuki Goto. "Musicream: New Music Playback Interfaces for Streaming, Sticking, Sorting, and Recalling Musical Pieces." ISMIR. 2005.

\* cited by examiner

MEDIA LIBRARY ANALYZER

CROSS-REFERENCE TO RELATED APPLICATIONS

This application is a continuation of claims priority to U.S. patent application Ser. No. 13/968,540, filed on Aug. 13, 2013, entitled "MEDIA LIBRARY ANALYZER," now issued as U.S. Pat. No. 9,383,965, the contents of which are incorporated by reference in its entirety herein.

BACKGROUND

An individual may accumulate large amounts of music content over time. As an individual listens to his or her music library, the individual may go through behavioral phases in what music he or she prefers. These phases may span days to months. It may be the case that the individual may wish to revisit music that he or she actively listened to at a previous point in time.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying trends in the way a user interacts with his or her music library and generating recommendations based on the trends. A user may have access to a music library made up of a group of audio items. An audio item such as a song may be played by the user any number of times. Rather than analyzing isolated instances of music playback, behavioral patterns that span a significant period of time may be ascertained based on a user's interaction with his or her music library. For example, a user may go through a phase where he or she plays back music of a particular genre, artist, or album. Furthermore, it may be the case that a user reverts back to previously exhibited behavioral patterns. For example, if a user actively listened to a particular band in the year 2012 and then stopped actively listening to that band, the user may be interested in revisiting his or her interest in that band's music at a later point in time. In this respect, the user listens to a particular band in phases. The present disclosure relates to leveraging the tendency to listen to music in phases.

Various embodiments of the present disclosure are directed to tracking and analyzing a user's interaction with his or her music library. Based on the user's interaction, various trends may be identified. Moreover, a transition from one trend to another trend may be identified. In this respect, a first trend may be characterized as a trigger for a subsequent trend. Accordingly, a recommendation for additional music may be generated in response to identifying one or more trends in the user's interaction with a music library.

Although the examples illustrating the embodiments of the present disclosure refer to music and audio, the scope of the present disclosure encompasses all forms of media such as video, movies, television programs, etc. In this respect, the present disclosure relates to behavioral trends relating to an interaction with various forms of media. A library may refer to a media library of audio and video content and items may refer to audio and or video items. In the following discussion, a general description of the system and its components is provided, followed by a discussion of the operation of the same.

Figure 1:
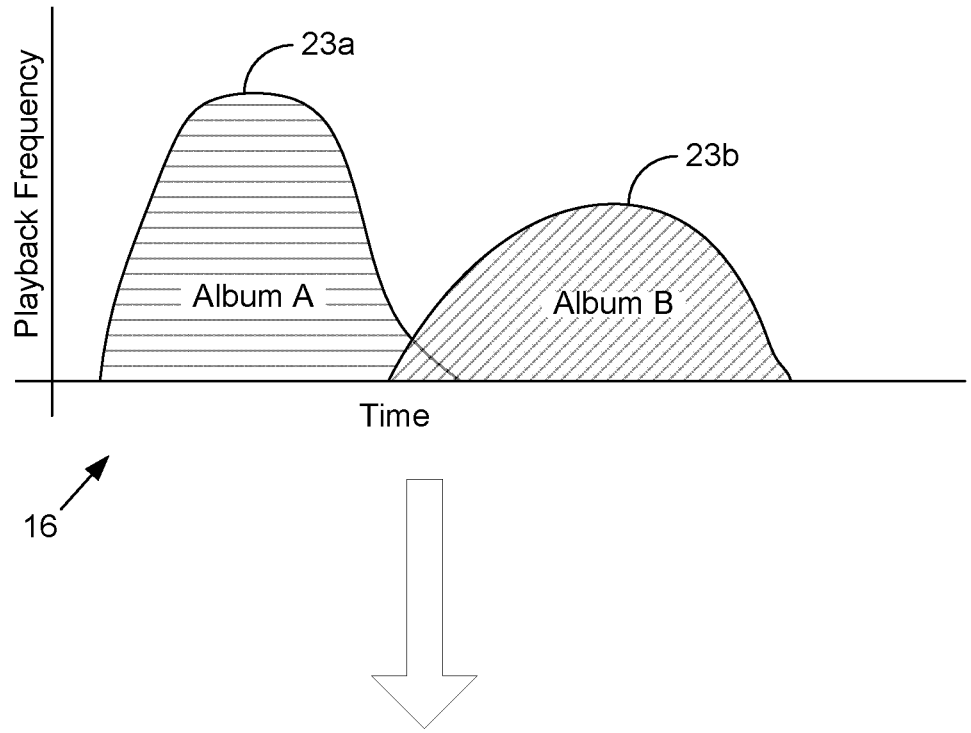
FIG. 1 is a drawing of an example of an operation of a library analyzer according to various embodiments of the present disclosure.
Figure 1:
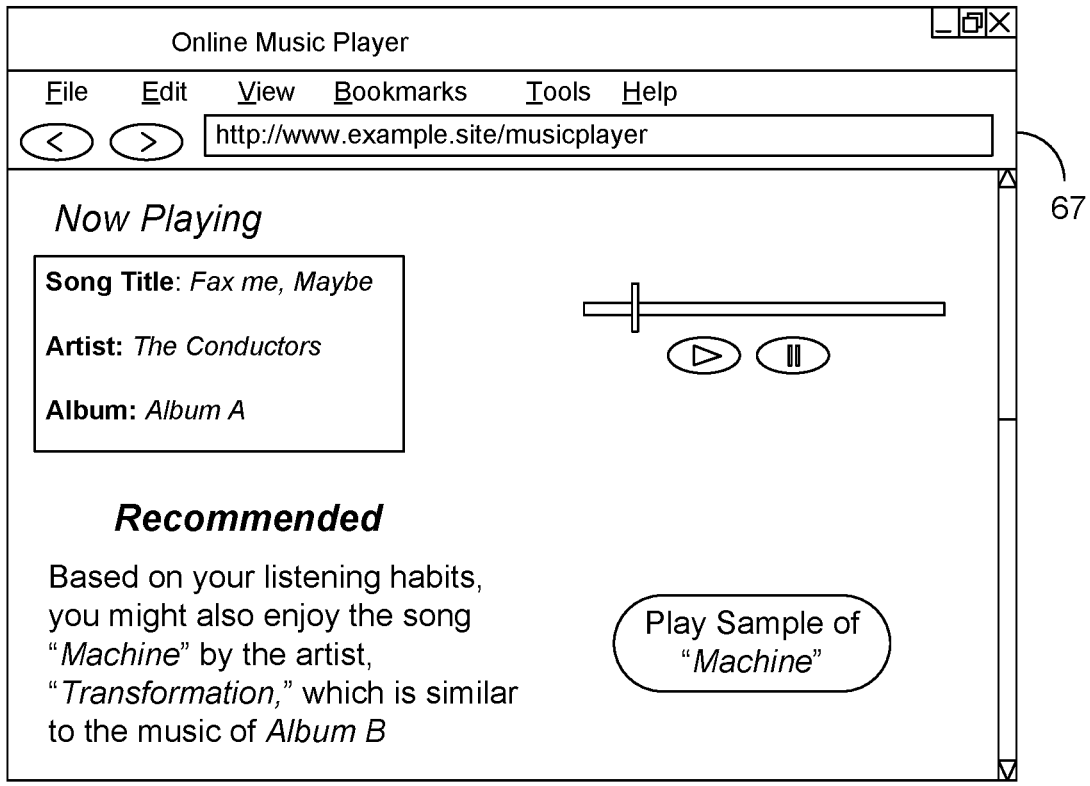

With reference to FIG. 1, shown is a drawing of an example of an operation of a library analyzer according to various embodiments of the present disclosure. A user may interact with his or her music library over time. Some songs in the library are played more often than other songs. However, the playback frequency of some songs may vary over time. One reason for this is that a user becomes tired or exhausted from listening to the class of music. Another reason is that a user may discover another preferred class of music. To this end, the user enters and exits various phases for listening to a particular class of music.

FIG. 1 depicts a music playback timeline 16 that represents the playback frequency of various albums over time. As shown in FIG. 1, a user plays songs of Album A for a substantial period of time. As time progresses, the user begins to play Album A less frequently and then begins to play Album B more frequently. In this respect, the playback timeline 16 depicts a first playback frequency distribution 23a for Album A and a second playback frequency distribution 23b for Album B. A playback frequency distribution 23 reflects a particular trend in the user's interaction with his or her music library. In other words, a playback frequency distribution represents an affinity a user has towards a particular set of songs associated with the playback frequency distribution 23.

The playback frequency distributions 23 of the music playback timeline 16 of FIG. 1 may be explained for any number of reasons related to the behavior of listening to music. One reason may be, for example, that the user discovers that he or she enjoys Album B after spending some time listening to Album A. Another reason may be, for example, that the user remembers that he or she enjoys Album B after listening to Album A.

The behavioral pattern of listening to an album at a high playback frequency for a substantial duration of time may be tracked and used to generate a recommendation. According to various embodiments, a library analyzer can identify one or more statistically significant playback frequency distributions 23. Moreover, the library analyzer can determine that a particular trend tends to follow another trend or that two trends in music playback are related to one another.

By analyzing the playback timeline 16, the library analyzer may determine that a behavioral pattern exists between listening to Album A and/or listening to Album B. The playback analyzer may generate a recommendation rendered in a user interface 67 for display to the user. The user interface 67 may allow a user to play back music from a music library. Based on recently played music, a recommendation for additional music may be generated. For example, based on the playback timeline 16, the library analyzer determines a relationship between Album A and Album B. If, at a later point in time, the user reverts back to his or her behavior of listening to music from Album A or music similar to Album A, then the library analyzer may generate a recommendation for music from Album B or music similar to Album B. The library analyzer generates recommendations for additional music that may either be a part of the user's music library or additional music that is to be included in the user's music library. A system and the components of the system that implement the functionality of the library analyzer are discussed in further detail below.

Figure 2A:
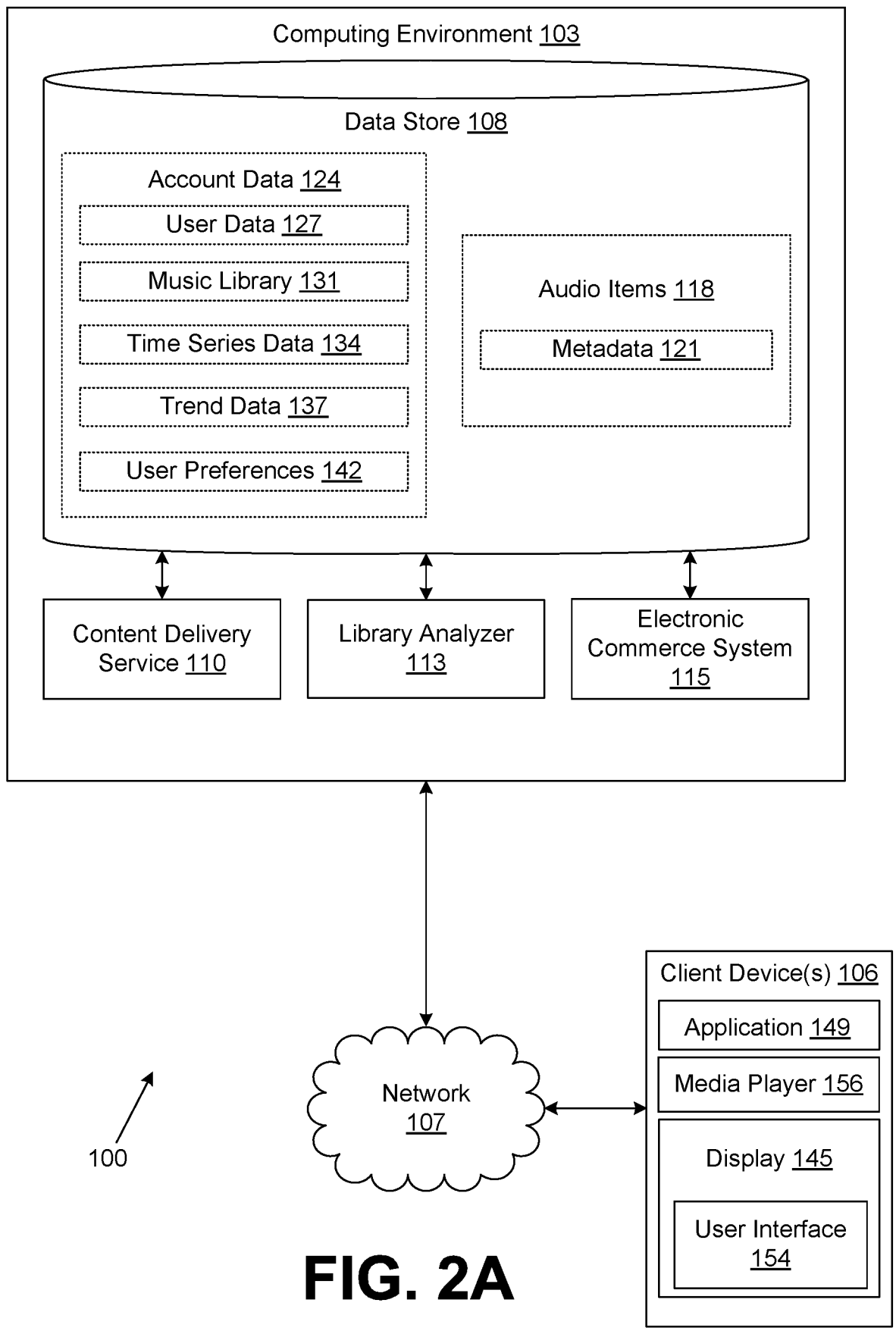
FIG. 2A is a drawing of an example of a networked environment according to various embodiments of the present disclosure.

With reference to FIG. 2A, shown is a networked environment 100 according to various embodiments. The networked environment 100 includes a computing environment 103, and one or more client devices 106, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 108 that is accessible to the computing environment 103. The data store 108 may be representative of a plurality of data stores 108 as can be appreciated. The data stored in the data store 108, for example, is associated with the operation of the various applications and/or functional entities described below.

The components executed on the computing environment 103, for example, include a content delivery service 110, a library analyzer 113, an electronic commerce system 115, and other applications, services, processes, systems, engines, or functionality not discussed in detail herein. The content delivery service 110 is executed to stream media content to remote devices for consumption. The content delivery service 110 facilitates the transmitting of media to a consuming audience. The content delivery service 110 may support various media-related operations such as, for example, identifying media files, encoding/decoding media files for playback, and/or transmitting media files to remote devices.

The library analyzer 113 is executed to track a user's interaction with his or her music library. The library analyzer 113 may generate a time series based on multiple instances of music library interaction. Moreover, the library analyzer 113 may determine one or more trends expressed in the time series and generate recommendations based on these trends. The electronic commerce system 115 is executed in order to facilitate the online purchase, leasing, or rental of items over the network 107. The electronic commerce system 115 also performs various backend functions associated with the online presence of a merchant in order to facilitate the online purchase of items. For example, the electronic commerce system 115 generates network pages such as web pages or other types of network content that are provided to client devices 106 for the purpose of selecting items for purchase, rental, download, lease, or other forms of consumption.

The data stored in the data store 108 includes, for example, audio items 118, account data 124, and potentially other data. An audio item 118 may be a song, a musical composition, an audio track, or an audio file that is formatted in a suitable audio format. An audio item 118 may be associated with corresponding metadata 121. The metadata 121 for an audio item 118 may specify an artist, an album, a genre, a musical category, a music time period, or any other attributes of the audio item. The metadata 121 may also include information relating to an analysis of the audio item 118 such as, for example, a tempo expressed in beats per minute, a Fourier transform signature, or any other audio analytic.

Account data 124 includes data associated with a user's account. A user may maintain an account for purchasing, storing, tracking, and/or managing audio items 118. The account data 124 may include user data 127, a music library 131, time series data 134, trend data 137, user preferences 142, or any other data associated with the account data 124. The user data 127 may include a user profile, password or other security information, credit card information, purchasing information, or any other information about the user. The music library 131 may comprise a list of audio items 118 that is accessible to the user. For example, the music library 131 may include all the audio items 118 that have been purchased, leased, or rented by the user. The time series data 134 includes the raw data resulting from tracking the user's interaction with his or her music library 131. Trend data 137 includes data resulting from analyzing the time series data 134. User preferences 142 include one or more user settings that control the manner in which the time series data 134 is generated and/or the manner in which trend data 137 is determined.

The client device 106 is representative of a plurality of client devices 106 that may be coupled to the network 107. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 145. The display 145 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 149 and/or other applications. The client application 149 may be executed in a client device 106, for example, to access network content served up by the computing environment 103 and/or other servers, thereby rendering a user interface 154 on the display 145. To this end, the client application 149 may comprise, for example, a browser, a dedicated application, etc., and the user interface 154 may comprise a network page, an application screen, etc. The client device 106 may be configured to execute applications beyond the client application 149 such as, for example, email applications, social networking applications, word processors, spreadsheets, and/or other applications. The client device 106 may also include a media player 156. The media player 156 may be executed in the client device 106 to cause a playing or performing of media items 118.

Next, a general description of the operation of the various components of the networked environment 100 is provided. To begin, a user may establish a music library 131 that references a collection of audio items 118. The user may purchase, lease, and/or rent audio items 118 using the electronic commerce system 115. The user may also upload audio items 118 from the client device 106 to the computing environment 103 over the network 107 to be stored in the data store 108. In either case, the music library 131 comprises a list of audio items 118 that a user may play using the media player 156.

A user may interact with his or her music library 131 by playing audio items using a media player 156. The media player 156 may be controlled by the user to facilitate a playing of audio items 118. For example, the user may initiate a pause command, a skip command, a repeat command, a shuffle command, a mute command, or perform any other operation for controlling the media player 156. The media player 156 may provide various controls for controlling the media player 156. In various embodiments, the media player 156 may communicate with a content delivery service 110 to receive media items 118 transmitted over the network 107. Media items 118 may be encoded by the content delivery service 110 and streamed to the media player 156 for playing the streamed media items 118 for a user using the client device 106.

As the media player 156 plays audio items 118 of a particular user's music library 131, a library analyzer 113 tracks the manner in which a user interacts with the media player 156. For example, the library analyzer 113 may identify each instance that a particular audio item 118 is played. The library analyzer 113 may also track the manner in which a user controls the media player 156 in causing a playback of audio items 118. Accordingly, the library analyzer 113 generates a history of interaction between a user and his or her music library 131. The library analyzer 113 stores this information as time series data 134. A time series is a sequence of data points measured at intervals of time. Each data point in the time series may reflect a particular instance of music library interaction between the user and his or her music library 131. In various embodiments of the present disclosure, each data point in the time series reflects an instance that spans an interval of time such as, for example, half a day, a day, a week, or any other interval of time. The library analyzer 113 may collect each data point along the time series according to a predetermined schedule.

As the time series data 134 is generated, the library analyzer 113 generates trend data 137 based on the time series data 134. The library analyzer 113 identifies any statistically significant trends expressed in the time series data 134. For example, the library analyzer 113 may identify one or more distributions reflecting a frequency of playback for a particular feature of audio items 118. The library analyzer 113 may analyze the time series data 134 for a particular audio feature. An audio feature may be, for example, an artist, an album, a genre, a tempo, or any other characteristic of an audio item 118. For a given audio feature, there may be multiple classes. For example, if the audio feature is "artist," then the various classes may include the various artists (e.g., Artist A, Artist B, etc.) represented in a user's music library 131. If audio feature is "tempo," then the various classes may include various ranges of tempos represented in the user's music library 131.

The library analyzer 113 identifies distributions of playback frequency and stores this information as trend data 137. Moreover the library analyzer 113 determines whether one distribution is relatively close to another distribution in time. Distributions that are proximately close to each other in terms of time may reflect a behavioral pattern exhibited by a user as the user interacts with his or her music library 131.

Based on these behavioral patterns, the library analyzer 113 may generate a recommendation for the user. The recommendation may include resurfacing a previously played audio item 118 that is a part of the user's music library 131. In this respect, the library analyzer 113 assists a user in rediscovering music that he or she enjoyed in the past. The recommendation may also include a recommended audio item that is not a part of the user's music library 131. For example, the recommended audio item may be an audio item that the user has not previously played. The recommended audio item may be associated with a purchase option to purchase the recommended audio item. Moreover, the recommended audio item may be associated with an audio sample of the recommended audio item to assist the user in determining whether the user is interested in the recommended audio item. Additionally, the library analyzer 113 may recommend items to be purchased from the electronic commerce system 115. These recommended items are not limited to audio items, but they may relate to the audio items 118. For example, the library analyzer may recommend concert tickets, video content, artist paraphernalia, or any other items relating to audio items 118.

The library analyzer 113 may encode for display a user interface 154 to facilitate a transmission of the recommendation to the user. For example the user interface 154 may be similar to the user interface 67 of FIG. 1.

Figure 2B:
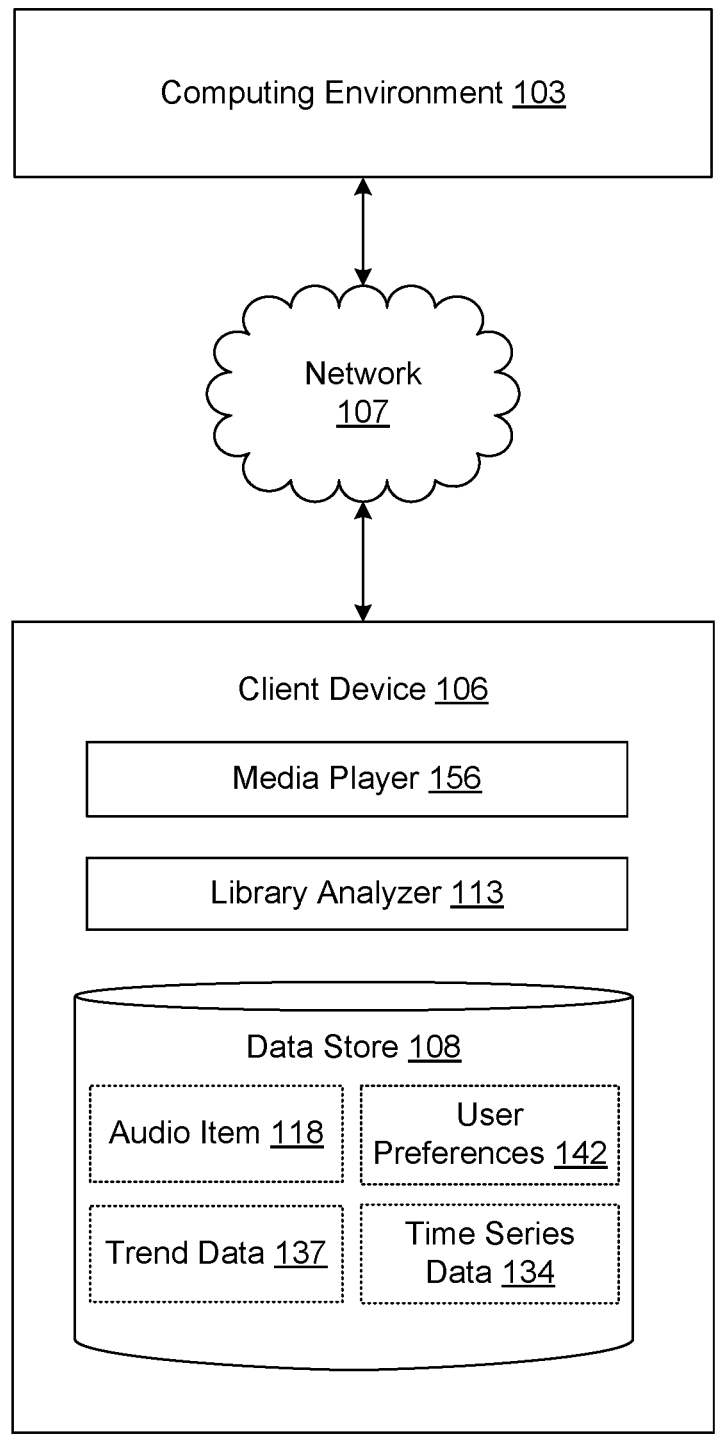
FIG. 2B is a drawing of another example of a networked environment according to various embodiments of the present disclosure.

Referring next to FIG. 2B, shown is another example of a networked environment 100 according to various embodiments of the present disclosure. The networked environment 100 of FIG. 2B represents an alternative or supplemental arrangement of the components depicted in the networked environment 100 of FIG. 2A. Specifically, the arrangement depicted in FIG. 2B migrates at least some functionality from the computing environment 103 to the client device 106.

For example, the client device 106 may comprise a media player 156 that is executed to cause a playing of audio items 118 in the client device 106. The media player 156 may access audio items 118 stored locally in a data store 108 of the client device 106. The client device 106 may locally execute the library analyzer 113 to track the user's interaction with various audio items 118 stored in the client device 106 and/or audio items 118 stored in the computing environment 103, as depicted in FIG. 2A. The library analyzer 113 generates time series data 134 and trend data 137 that is also stored in the client device 106.

FIGS. 2A and 2B depict some arrangements of the components of the networked environment 100; however, other arrangements are within the scope of the present disclosure. For example, portions of the media player 156 and portions of the library analyzer 113 may be executed in a combination of the computing environment 103 and the client device 106. As another example, the client device 106 may generate the time series data 134 and/or trend data 137 and push the time series data 134 and/or trend data 137 to the computing environment 103 by way of a network 107. Moreover, the audio items 118 may be stored in a combination of the data store 108 of the computing environment 103 or the data store 108 of the client device.

According to various embodiments, the music library 131 (FIG. 2A) includes all the audio items 118 to which a user has permission and/or access. These may be audio items 118 stored in the client device 118 as well as audio items 118 stored in the computing device 103.

Figure 3:
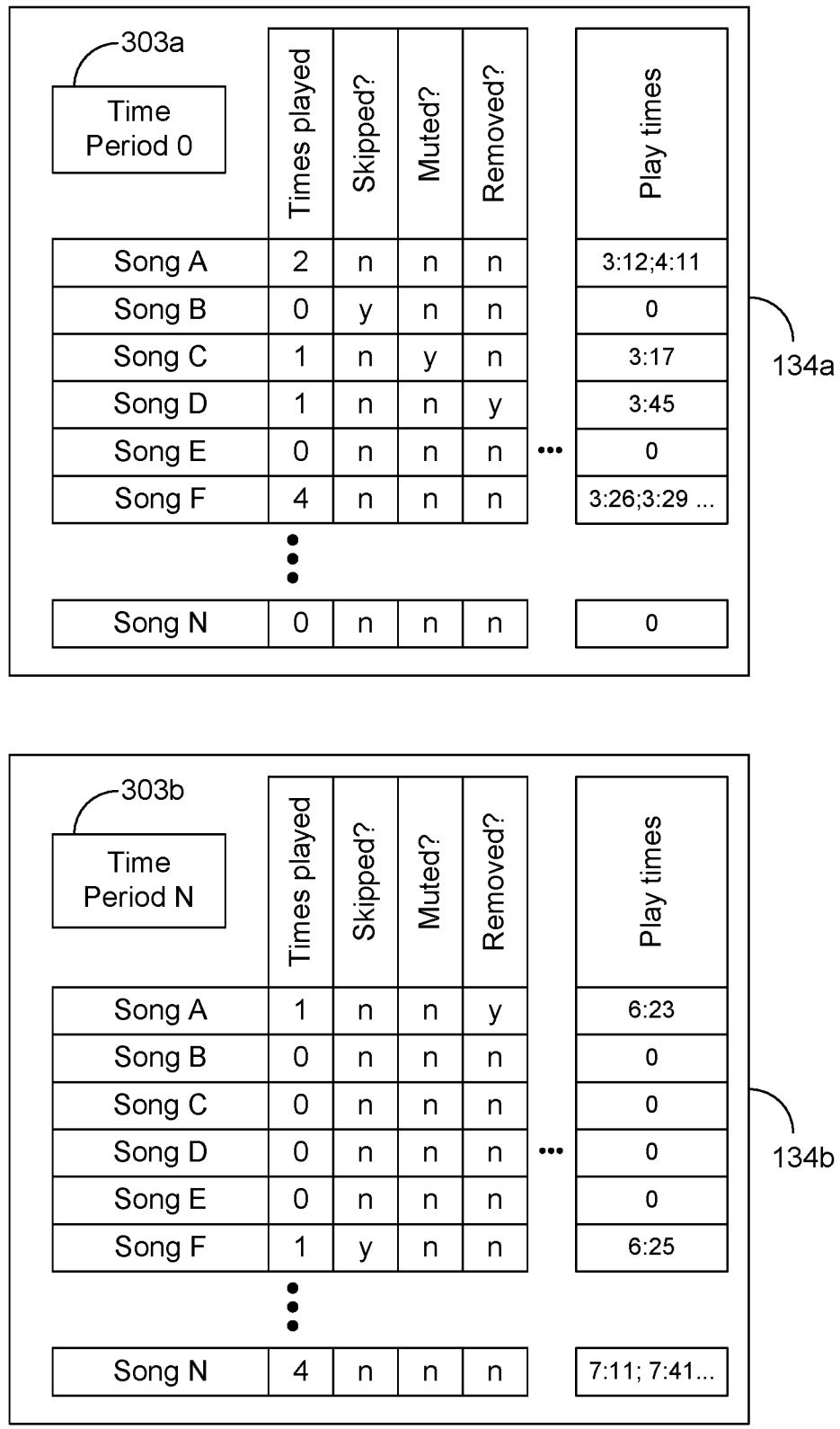
FIG. 3 is an example of time series data used in the networked environment of FIG. 2A or 2B according to various embodiments of the present disclosure.

Turning now to FIG. 3, shown is an example of time series data 134 used in the networked environment 100 of FIG. 2A or 2B according to various embodiments of the present disclosure. FIG. 3 depicts a first instance of music library interaction 134a within a music library 131 (FIG. 2A). The first instance of music library interaction 134a may represent a data point in a time series of the time series data 134. The first instance of music library interaction 134a is associated with a particular period of time 303a. Throughout this period of time 303a, interactions with the music library 131 are tracked. The library analyzer 113 (FIG. 2A or FIG. 2B) tracks various operations performed by a media player 156 (FIG. 2A or FIG. 2B). For example, a user may control a media player 156 to play, skip, or mute a particular audio item 118. The user may also add or remove an audio item 118 from a playlist. These operations may be tracked and recorded by the library analyzer 113.

As depicted in FIG. 3, the first instance of music library interaction 134a represents information tracked by a library analyzer 113 for a particular period of time 303a. During this period of time 303a, the library analyzer 113 tracks an activity or a lack of activity for each audio item 118 in a user's music library 131. For example, the library analyzer 113 may identify whether a particular audio item 118 was played or a number of times the audio item 118 was played for the particular period of time 303a. That is to say, the library analyzer 113 tracks the number of times a media player 156 executes a play command for a given audio item 118. In some embodiments, the library analyzer 113 tracks the times a particular media item 118 is played throughout a particular period of time 303a, 303b. The library analyzer 113 may identify whether the user initiated a skip command for a particular audio item 118. A skip command may comprise instructing the media player 156 to fast-forward or otherwise seek ahead to a next audio item 118. The library analyzer 113 may further track whether the user initiated a mute command for the audio item 118, whether the user performed an add command to add an audio item 118 to a playlist, and/or whether the user performed a remove command to remove the audio item 118 from a playlist.

The library analyzer 113 may store the first instance of music library interaction 134a as a data point of a time series in the time series data 134. At a subsequent period of time 303b, the library analyzer 113 may track an activity or lack of activity for the various audio items 118 in the user's music library 131. The activity or lack of activity at the subsequent period of time 303b may be stored as a subsequent data point in the time series of the time series data 134. Thus, FIG. 3 depicts two data points (e.g., the first instance of music library interaction 134a and the second instance of music library interaction 134b) in the time series data 134.

According to various embodiments, the library analyzer 113 generates a data point according to a predetermined schedule. For example, if the schedule specifies a daily tracking, then the library analyzer 113 generates the first instance of music library interaction 134a for a first day and generates the second instance of music library interaction 134b for a second day, where the first time period 303a spans the first day and the second time period 303b spans the second day. In this respect, the library analyzer 113 updates the time series data 134 each day as the user interacts or does not interact with his or her music library 131 on a daily basis.

Thus, the time series data 134 comprises a time series made up of multiple instances of interaction that may be plotted along a time axis. Various trends may be determined based on accounting for multiple instances of interaction with the user's music library 131. For example, according to the first instance of music library interaction 134a, the user played the audio item 118 of "Song F" four times throughout a particular period of time 303a. This data point alone might not be sufficient to determine a trend; however based on data points temporally proximate to the particular period of time 303a, various trends may be determined.

Additionally, the audio item 118 of "Song B" was skipped during this particular period of time 303a. The library analyzer 113 may determine that the user may prefer not listening to "Song B." Accordingly, the library analyzer 113 may flag "Song B" to ensure that "Song B" is not subsequently recommended to the user.

Figure 4:
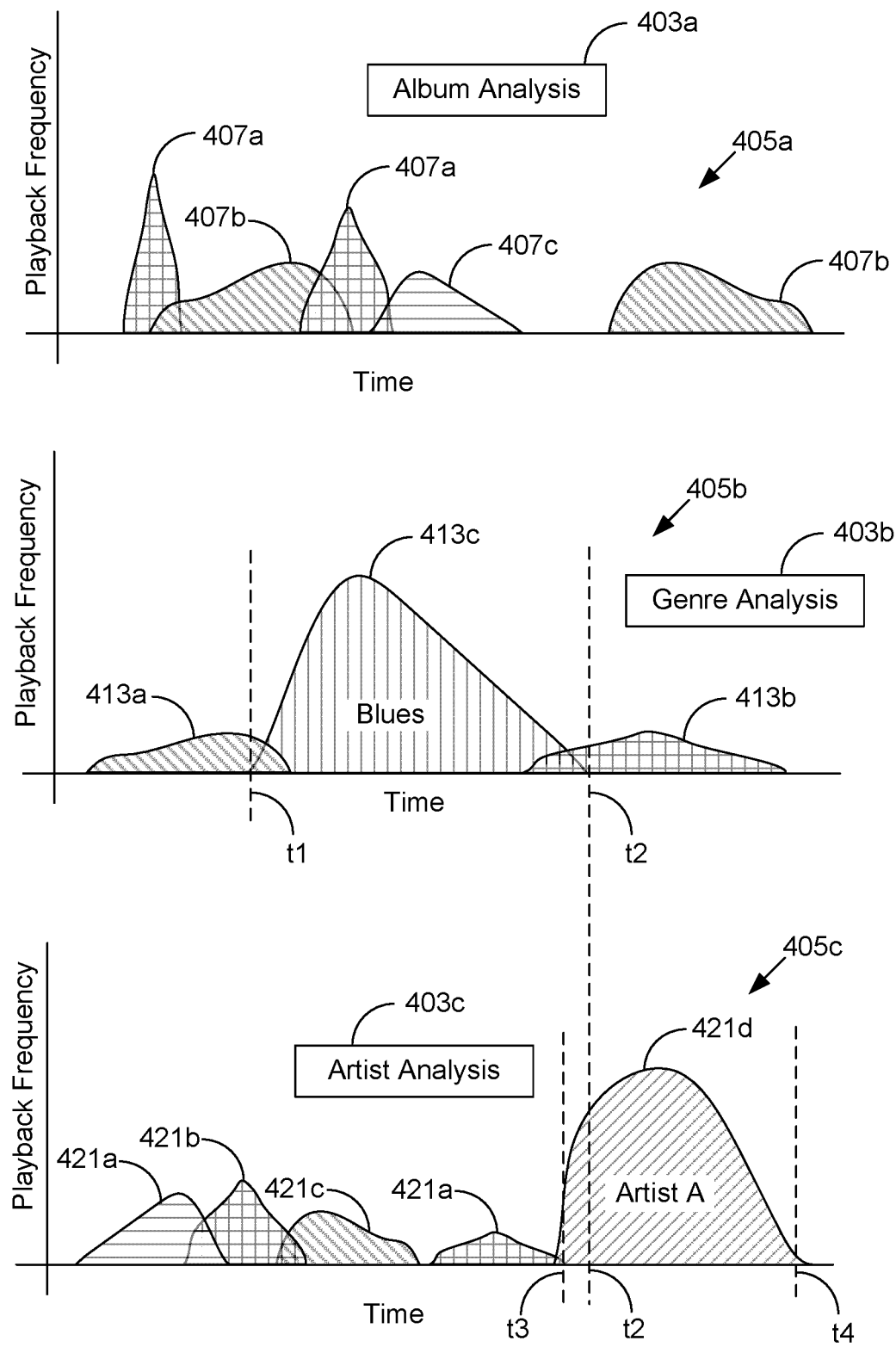
FIG. 4 is a drawing of an example of an operation of a library analyzer implemented in the networked environment of FIG. 2A or 2B according to various embodiments of the present disclosure.

Moving on to FIG. 4, shown is an example of an operation of a library analyzer 113 (FIG. 2A or 2B) implemented in the networked environment 100 of FIG. 2A or 2B according to various embodiments of the present disclosure. Specifically, FIG. 4 depicts an operation of analyzing time series data 134 (FIG. 2A or 2B) to generate trend data 137 (FIG. 2A or 2B). The library analyzer 113 identifies statistically significant trends in the time series data 134 to determine the manner in which to make recommendations to a user. The library analyzer 113 may analyze the time series data 134 according to various audio features 403. The non-limiting example of FIG. 4 depicts an example of analyzing time series data 134 according to an album audio feature 403a, a genre audio feature 403b, and an artist audio feature 403c. The non-limiting example of FIG. 4 represents that, for a particular user, listening to blues audio items 118 provides a trigger to listening to Artist A.

FIG. 4 depicts a first analysis 405a where the library analyzer 113 determines whether a trend exists with respect to an album audio feature 403a. In this respect, the library analyzer 113 uses metadata 121 (FIG. 2A) specifying an album for each audio item 118 (FIG. 2A or 2B) of the time series data 134. The library analyzer 113 classifies each audio item 118 of the time series data 134 into an album class. That is to say, an audio item 118 falls within a particular album class and the playback frequency of each album is determined according to the time series data 134. As shown in FIG. 4, various distributions 407 are expressed in the time series data 134 with regard to the album audio feature 403a. These distributions 407 represent the playback frequency of various albums over multiple instances of interaction with a music library 131 (FIG. 2A). For example, the distribution of the first album 407a exists in distinct periods of time. To determine whether these distributions are statistically significant, the height and/or width are compared to a threshold amount. If the playback frequency distribution 407 spans a significant width of time and/or has a relatively large peak, then that distribution may be deemed statistically significant.

The first analysis 405a also yields the distributions of a second album 407b and a distribution of a third album 407c. However, none of these distributions 407 have a sufficiently large width and/or peak/height. Accordingly, the library analyzer 113 determines that no trends exist with respect to analyzing the time series data 134 according to the album audio feature 403a.

FIG. 4 also depicts a second analysis 405b where the library analyzer 113 determines whether a trend exists with respect to a genre audio feature 403b. In this respect, the library analyzer 113 uses metadata 121 specifying a genre for each audio item 118 of the time series data 134. The library analyzer 113 classifies each audio item 118 of the time series data 134 into a respective genre class. That is to say, an audio item 118 falls within a particular genre and the playback frequency of each genre is determined according to the time series data 134.

As shown in FIG. 4, various distributions 413 are expressed in the time series data 134. The distributions of a first genre 413a and a second genre 413b have relatively shallow heights/peaks. Accordingly, the library analyzer 113 may determine that there is no statistically significant trend associated with a playback of audio items 118 falling within either the first genre having a distribution 413a or second genre having a distribution 413b. However, a blues genre may be deemed to have a statistically significant distribution 413c because the width of this distribution and/or height/peak of this distribution is relatively large.

A relatively large width of a distribution signifies that the user played audio items 118 of a particular class for a relatively long period of time. For example, many sequential instances of interaction reflect the fact that audio items 118 of the particular class were played. A relatively large height and/or peak signifies that the user frequently played audio items 118 of the particular class.

As shown in the second analysis 405b, the user began listening to audio items 118 falling within the blues genre at a time of t=t1 and stopped listening to audio items 118 falling within the blues genre at a time of t=t2. The blues genre distribution 413c may be characterized by one or more timestamps that reflect a historical point in time when the user had an affinity to audio items 118 falling within the blues genre. The library analyzer 113 may associate a particular distribution with one or more timestamps. A timestamp may be the time at which a user began listening to audio items 118 (e.g., t1), the time at which the user stops listening to audio items 118 (e.g., t2), or any time in between, such as a peak time. Timestamps may be generated according to various statistical properties of the distribution such as, for example, the standard deviation, a p-value, a t-value, etc. Thus, a timestamp of a distribution represents when the user expressed an affinity towards audio items 118 associated with the distribution. Moreover, a statistically significant distribution indicates the presence of a behavioral pattern such as a music listening phase.

FIG. 4 further depicts a third analysis 405c where the library analyzer 113 determines whether a trend exists with respect to an artist audio feature 403c. In this respect, the library analyzer 113 uses metadata 121 specifying an artist for each audio item 118 of the time series data 134. The library analyzer 113 classifies each audio item 118 of the time series data 134 into a respective artist class. That is to say, an audio item 118 is associated with a particular artist and the playback frequency of each artist is determined according to the time series data 134.

As shown in FIG. 4, various distributions 421 are expressed in the time series data 134. The distributions of a first artist 421a, a second artist 421b, and a third artist 421c have relatively shallow heights/peaks. Accordingly, the library analyzer 113 may determine that there is no distinctly significant trend associated with a playback of audio items 118 having the first, second or third artists. However the Artist A distribution 421d may be deemed be a statistically significant distribution because the width of this distribution and/or height or peak of this distribution is relatively large.

As shown in the third analysis 405c, the user began listening to audio items 118 associated with Artist A at a time of t=t3 and stopped listening to audio items 118 associated with Artist A at a time of t=t4. The distribution of Artist A 421d may be characterized by one or more timestamps that reflect a historical point in time when the user had an affinity to audio items 118 associated with Artist A.

Additionally, the non-limiting example of FIG. 4 depicts that t3 precedes t2, which indicates that the user listened to blues and then transitioned to listening to audio items 118 associated with Artist A. The library analyzer 113 determines that a relationship exists between the blues genre and Artist A based on comparing timestamps of the distributions 413c and 421d. Specifically, the library analyzer 113 determines that t2 is relatively close to t3, thus indicating a causal relationship between the blues genre 413c and the Artist A class 425d. For example, the library analyzer 113 may associate audio items 118 performed by Artist A to a triggering event of audio items 118 falling within the blues genre 413c.

Because past historical data of the time series data 134 reflects that the user tends to listen to Artist A after listening to blues, the library analyzer 113 may recommend audio items 118 performed by Artist A or audio items 118 similar to Artist A in response to the user listening to blues audio items 118. To summarize, a particular distribution expressed in the time series data 134 represents a behavioral phase of having an affinity towards a particular class of audio items 118. By detecting transitions from one phase to another, the library analyzer 113 may generate recommendations if a listening pattern is repeated. As depicted in FIG. 4, the user exhibits a behavior of listening to blues music and then listening to Artist A. Thus, blues music may be a trigger to listening to Artist A.

Figure 5:
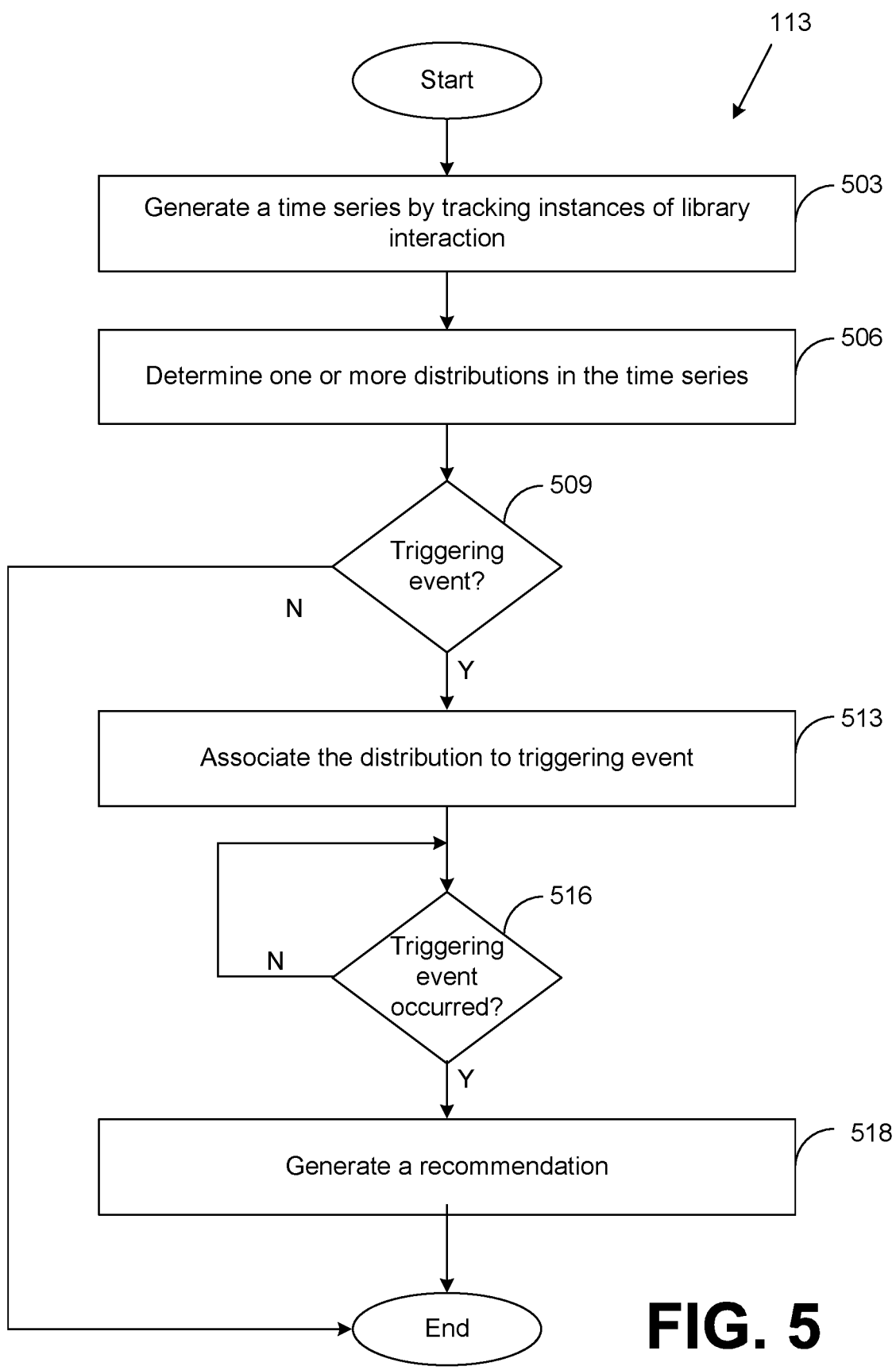
FIG. 5 is a flowchart illustrating one example of functionality implemented as portions of a library analyzer executed in a computing environment in the networked environment of FIG. 2A or 2B according to various embodiments of the present disclosure.

Referring next to FIG. 5, shown is a flowchart that provides one example of the operation of a portion of the library analyzer 113 according to various embodiments. It is understood that the flowchart of FIG. 5 provides merely an example of the many different types of functional arrangements that may be employed to implement the operation of the portion of the library analyzer 113 as described herein. As an alternative, the flowchart of FIG. 5 may be viewed as depicting an example of elements of a method implemented in the networked environment 100 (FIG. 2A or 2B) according to one or more embodiments.

At 503, a library analyzer 113 generates a time series by tracking instances of library interaction. The library analyzer 113 may store the time series as time series data 134 (FIG. 2A or 2B). According to various embodiments, the library analyzer 113 stores instances of library interaction according to a predefined schedule. For example, the library analyzer 113 may track daily instances of interaction with a user's music library 131 (FIG. 2A). Thus, a specific instance of music library interaction may reflect the manner in which a user interacts with his or her music library 131 throughout the day. The library analyzer 113 may store the time series data 134 in a data store 108 (FIG. 2A or 2B) of the client device 106 (FIG. 2A or 2B) or in a data store 108 of a computing environment 103 (FIG. 2A or 2B). In this respect, the time series data 134 represents raw data indicating how a user interacts with his or her music library 131 and various instances of time.

At 506, the library analyzer 113 determines one or more distributions in the time series. According to various embodiments, the library analyzer 113 performs multiple analyses where each analysis is dedicated to a particular audio feature 403 (FIG. 4). For example, the library analyzer 113 may analyze trends of the time series data 134 with respect to artist, album, tempo, genre, or any other audio feature 403. When analyzing the time series data 134 for a particular audio feature 403, the library analyzer 113 determines whether there is a trend for one or more classes of audio items 118 (FIG. 2A or 2B). For example, if the library analyzer 113 is analyzing the time series data 134 with respect to a tempo audio feature, the library analyzer 113 identifies whether there are any trends with respect to various ranges in tempo. For example, there may be a trend with respect to audio items 118 falling between 85 to 95 beats per minute (bpm). That is to say, a user demonstrated an affinity towards music items having a tempo of 85 to 95 bpm.

The library analyzer 113 may determine that a particular distribution is statistically significant in response to that distribution having a width that exceeds a threshold amount and/or a height/peak that exceeds a threshold amount. In this respect, the size of the distribution affects whether the library analyzer 113 deems that the distribution is statistically significant. According to various embodiments, a distribution is any playback distribution that spans a period of time, where the height of the distribution reflects the frequency of playback and the width of the distribution represents a duration of time that the user plays back a particular class of audio items 118. After identifying a statistically significant distribution, the library analyzer 113 stores the result as trend data 137 (FIG. 2A or 2B). The occurrence of a statistically significant distribution indicates that the user has entered/exited a phase of music listening behavior.

According to various embodiments, the library analyzer 113 associates a distribution with one or more timestamps. A timestamp reflects a point of time of the users listening behavior with respect to the distribution. The timestamp may be the beginning of the distribution, the end of the distribution or any point in time in between. For example, a user may play a particular album at a relatively high playback frequency throughout the month of June 2013. The timestamp associated with this distribution may be any point in time in the month of June 2013.

In some embodiments, the user may submit a user input specifying a range of time to be considered in order to determine whether a distribution is expressed in the time series data 134. The user input may be stored as a user preference 142 (FIG. 2A or 2B) in a data store 108. The library analyzer 113 may use only those instances of music library interaction that fall within the specified duration of time to identify any distributions. For example, the user input may instruct the library analyzer 113 to only analyze the two most recent years of time series data 134 to determine any trends in listening behavior.

At 509, the library analyzer 113 determines whether a particular distribution may be associated with a triggering event 509. According to various embodiments, a triggering event may be determined based on a timestamp of another distribution. As depicted in the non-limiting example of FIG. 4, the library analyzer 113 determines that the Artist A distribution 421d (FIG. 4) has a timestamp that is relatively close to the timestamp of the blues genre distribution 413c (FIG. 4). Thus the playing of blues music is a triggering event to the playing of audio items 118 associated with Artist A.

In various embodiments, the triggering event may comprise a predetermined period of time. In this case, the library analyzer 113 may add the predetermined period of time to a timestamp of the distribution to cause a future playback of audio items 118 falling within the class associated with the distribution. For example, the predetermined period of time may be equivalent to one year. In this case, if a distribution that indicates that a user actively listened to audio items 118 associated with a blues genre in June 2013, the library analyzer 113 may surface or otherwise recommend audio items 118 associated with the blues genre one year later in June 2014. By setting the triggering event to a predetermined period of time, the library analyzer 113 may automatically surface or recommend audio items associated with a past behavioral music listening phase.

At 513, the library analyzer 113 associates the distribution to the triggering event. The library analyzer 113 may store a relationship between the distribution and the triggering event as trend data 137. In the non-limiting example of FIG. 4, the library analyzer 113 stores relationship data indicating that audio items 118 associated with Artist A tend to be played after playing audio items associated with the genre of blues.

At 516, the library analyzer 113 determines whether a triggering event occurred. The triggering event may be a recently played audio item 118 that falls within a first class, where a relationship exists between the first class and a second class. The triggering event may also be a lapse of a predetermined period of time in the case where the triggering event is a predetermined period of time.

At 518, the library analyzer 113 generates a recommendation if the triggering event occurs. The recommendation may be generated according to the trend data 137. In the non-limiting example of FIG. 4, the triggering event is a playing of audio items 118 falling with the blues genre. Accordingly, a recommendation is generated for audio items 118 associated with Artist A or audio items 118 similar to Artist A.

In some embodiments, metadata 121 (FIG. 2A) for an audio item indicates whether that audio item 118 is similar to one or more other audio items 118. For example, it may be predetermined that many users who express an affinity towards Artist R are likely to express an affinity towards Artist Y. This information may be stored as metadata 121. Thus, a recommendation for Artist R may be analogous to a recommendation for Artist Y. To this end, a recommendation may be made for a particular class when that class has a predetermined relationship with another class. These predetermined relationships may be based on statistical data collected from many users such that it is not specific to a particular user.

The trend data 137 may include a relationship between two different classes of audio items 118. For example, one class is a first album and a second class is a second album. As another example, the first class is a first album and the second class is a particular tempo range. The relationship between two classes of audio items 118 is determined based on the proximity of corresponding playback frequency distributions. If the timestamps of two distributions fall within a threshold amount, then the library analyzer 113 determines that a relationship between the two distributions exists. This is depicted in the non-limiting example of FIG. 4 where t2 is temporally proximate to t3, where t2 represents a timestamp of one distribution while t3 represents a timestamp of another distribution.

In various embodiments, the library analyzer 113 generates a recommendation for a non-audio item 113 that may be purchased via an electronic commerce system 115 (FIG. 2A). For example, the trend data 137 may indicate a relationship between Artist A and Album S, where the playing of Album S provides a trigger for audio items of Artist A. The library analyzer 113 may identify a recommended item that relates to Artist A such as, for example, concert tickets to a performance by Artist A, Artist A paraphernalia, media content relating to Artist A such as video content, or any other item relating to Artist A. After the library analyzer 113 identifies or generates a recommendation, the library analyzer 113 may include an identifier of the recommendation in a user interface such as, for example, the user interface 67 of FIG. 1. The identifier may be a name, a number, a title, or any other identifier for the recommended item. For example, if the library analyzer 113 identifies a documentary relating to Artist A as a recommended item, the library analyzer may include an identifier referencing the documentary in a user interface 67 (FIG. 1).

Figure 6:
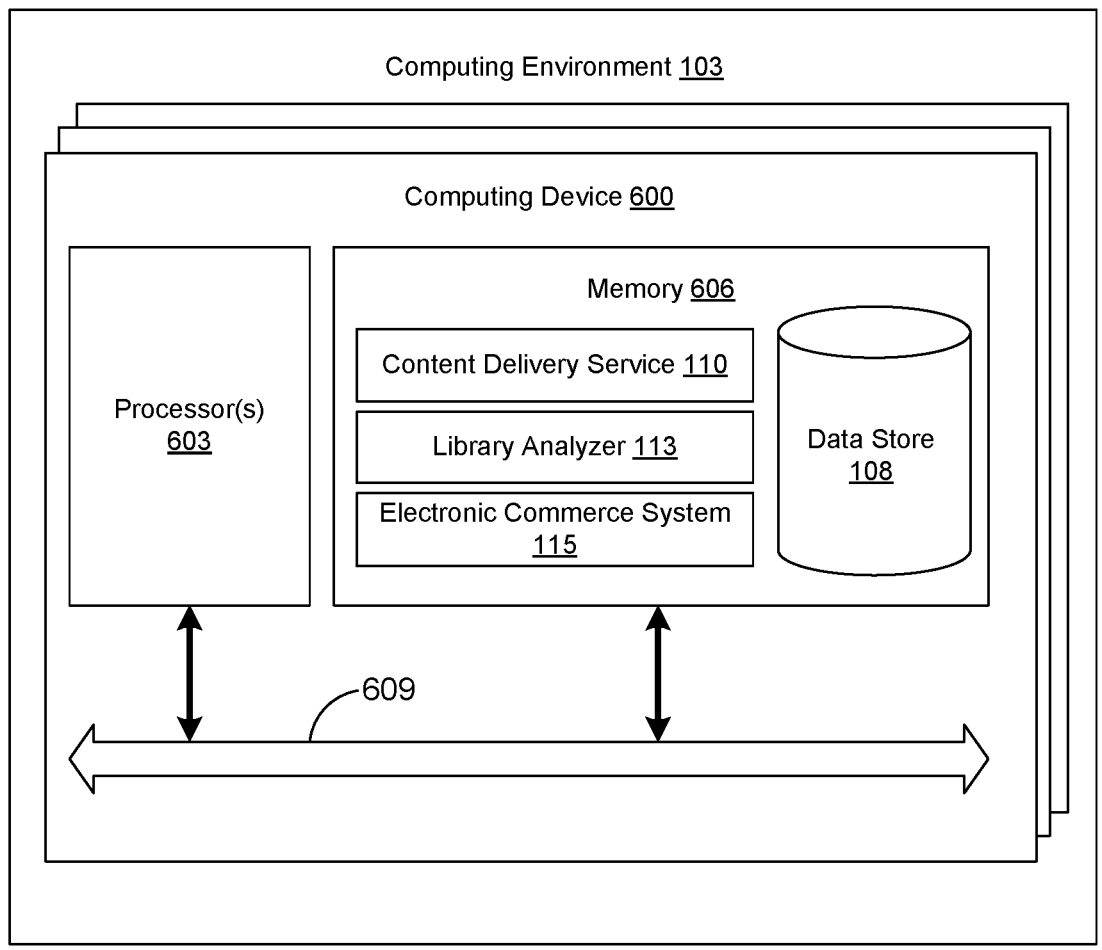
FIG. 6 is a schematic block diagram that provides one example illustration of a computing environment employed in the networked environment of FIG. 2A or 2B according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the content delivery service 110, the library analyzer 113, the electronic commerce system 115, and potentially other applications. Also stored in the memory 606 may be a data store 108 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the content delivery service 110, the library analyzer 113, the electronic commerce system 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the library analyzer 113. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 (FIG. 6) in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 110, the library analyzer 113, and the electronic commerce system 115, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 110, the library analyzer 113, and the electronic commerce system 115, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600 or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   program instructions executable in the at least one computing device that, when executed by the at least one computing device, cause the at least one computing device to:
   identify a behavioral pattern where a user has transitioned from a trend of listening to a first type of music to a trend of listening to a second type of music based on an analysis of a plurality of interactions with a music library by:
      accessing time series data comprising at least a portion of the plurality of interactions with the music library;
      identifying a first playback frequency distribution from the time series data representing playback frequency of a first set of media items associated with the first type of music, the first playback frequency distribution being identified as meeting a distribution threshold;
      identifying a second playback frequency distribution from the time series data representing playback frequency of a second set of media items associated with the second type of music, the second playback frequency distribution being identified as meeting the distribution threshold;
      identifying a causal relationship between the first playback frequency distribution and the second playback frequency distribution based on least in part on a time proximity of the first playback frequency distribution and the second playback frequency distribution in the time series; and
      storing trend data associated with the causal relationship between the first playback frequency distribution and the second playback frequency distribution in a data store;
   identify a playback of at least one media item associated with the first type of music;
   generate a recommended media item associated with the second type of music based at least in part on the trend data; and
   encode user interface data comprising the recommended media item for transmission to a client device.

2. The system of claim 1, further comprising program instructions that, when executed, cause the at least one computing device to associate the first playback frequency distribution with a triggering event identified from the time series data.

3. The system of claim 2, wherein the triggering event is identified from the time series data by:
   generating a first timestamp for the first playback frequency distribution reflecting a time at which the user stopped interacting with the first set of media items associated with the first type of music;
   generating a second timestamp for the second playback frequency distribution reflecting a time at which the user started interacting with the second set of media items associated with the second type of music; and
   identifying that the first timestamp and the second timestamp fall within a threshold amount in the time series.

4. The system of claim 1, wherein the first type of music and the second type of music are a same class of musical artist, album, music genre, or music tempo.

5. The system of claim 1, wherein the first type of music and the second type of music are a different class of musical artist, album, music genre, or music tempo.

6. The system of claim 1, storing metadata in one media item in the first set of media items associated with the second type of music, wherein the recommendation is generated based at least in part on an analysis of the metadata.

7. The system of claim 1, wherein the user interface data causes a client application executable in the client device to cause the recommended media item to be rendered in a display device.

8. The system of claim 7, wherein the client application comprises a browser application or a media player application.

9. A non-transitory computer-readable medium embodying program code executable in at least one computing device that, when executed by the at least one computing device, causes the at least one computing device to:
   identify a transition from a first trend of accessing media items of a first category to a second trend of accessing media items of a second category based on an analysis of a plurality of user interactions with a media library by:
      generating a time series comprising at least a portion of the plurality of user interactions with the media library for a period of time;
      identifying a first playback frequency distribution in the time series having a first interaction frequency associated with the first category that meets a first threshold;
      identifying a second playback frequency distribution in the time series having a second interaction frequency associated with the second category that meets a second threshold; and
      storing an association of the first playback frequency distribution and the second playback frequency distribution in memory based at least in part on a time proximity of the first playback frequency distribution and the second playback frequency distribution in the time series;
   identify a reversion back to the first trend of accessing media items of the first category based at least in part on a playback of at least one item in the media library being associated with the first category; and
   generate a recommended media item being associated with the second category based on the association stored in the memory.

10. The non-transitory computer-readable medium of claim 9, wherein the recommended media item is selected from the media library.

11. The non-transitory computer-readable medium of claim 9, wherein the recommended media item is selected from outside of the media library.

12. The non-transitory computer-readable medium of claim 9, wherein the recommended media item comprises one of: a music item, a video item, a movie item, or a television program item.

13. The non-transitory computer-readable medium of claim 9, wherein individual ones of the plurality of user interactions comprise an operation for controlling a media player application executable on a client device.

14. The non-transitory computer-readable medium of claim 13, wherein the operation comprises at least one of: a play command, a pause command, a skip command, a repeat command, a shuffle command, or a mute command.

15. A computer-implemented method, comprising:
   storing, by at least one computing device having at least one hardware processor, a plurality of user interactions with a media library performed on a client device in data communication with the at least one computing device;
   identifying, by the at least one computing device, a transition from a first trend of accessing media items of a first category to a second trend of accessing media items of a second category based on an analysis of the plurality of user interactions by:
      generating a time series comprising at least a portion of the plurality of user interactions with the media library for a period of time;
      identifying a first playback frequency distribution in the time series having a first interaction frequency associated with the first category that meets a first threshold; and
      identifying a second playback frequency distribution in the time series having a second interaction frequency associated with the second category that meets a second threshold;
   identifying, by the at least one computing device, a playback of at least one item in the media library being associated with the first category; and
   generating, by the at least one computing device, a recommended media item being associated with the second category.

16. The computer-implemented method of claim 15, further comprising storing, by the at least one computing device, an association of the first playback frequency distribution and the second playback frequency distribution in memory based at least in part on a time proximity of the first playback frequency distribution and the second playback frequency distribution in the time series.

17. The computer-implemented method of claim 15, wherein identifying the transition from the first trend of accessing media items of the first category to the second trend of accessing media items of the second category further comprises:
   identifying, by the at least one computing device, a first timestamp for the first playback frequency distribution;
   identifying, by the at least one computing device, a second timestamp for the second playback frequency distribution; and
   identifying that the first timestamp and the second timestamp fall within a threshold amount in the time series.

18. The computer-implemented method of claim 17, wherein the first timestamp and the second timestamp are generated as: a time at which a user began listening to a media item, a time at which the user stopped listening to the media item, a peak time during playback of the media item, a standard deviation, a p-value, or a t-value.

19. The computer-implemented method of claim 18, wherein:
- the peak time in the first playback frequency distribution is identified between a time at which the user began playing a first set of media items and a time at which the user stopped playing the first set of media items; and
- the peak time in the second playback frequency distribution is identified between a time at which the user began playing a second set of media items and a time at which the user stopped playing the second set of media items.

20. The computer-implemented method of claim 19, further comprising sending the recommended media item to a client device, wherein a client application executable in the client device causes the recommended media item to be rendered in a display device, the client application comprising a browser application or a media player application.

\* \* \* \* \*